United States Patent Office 2,995,983
Patented Aug. 15, 1961

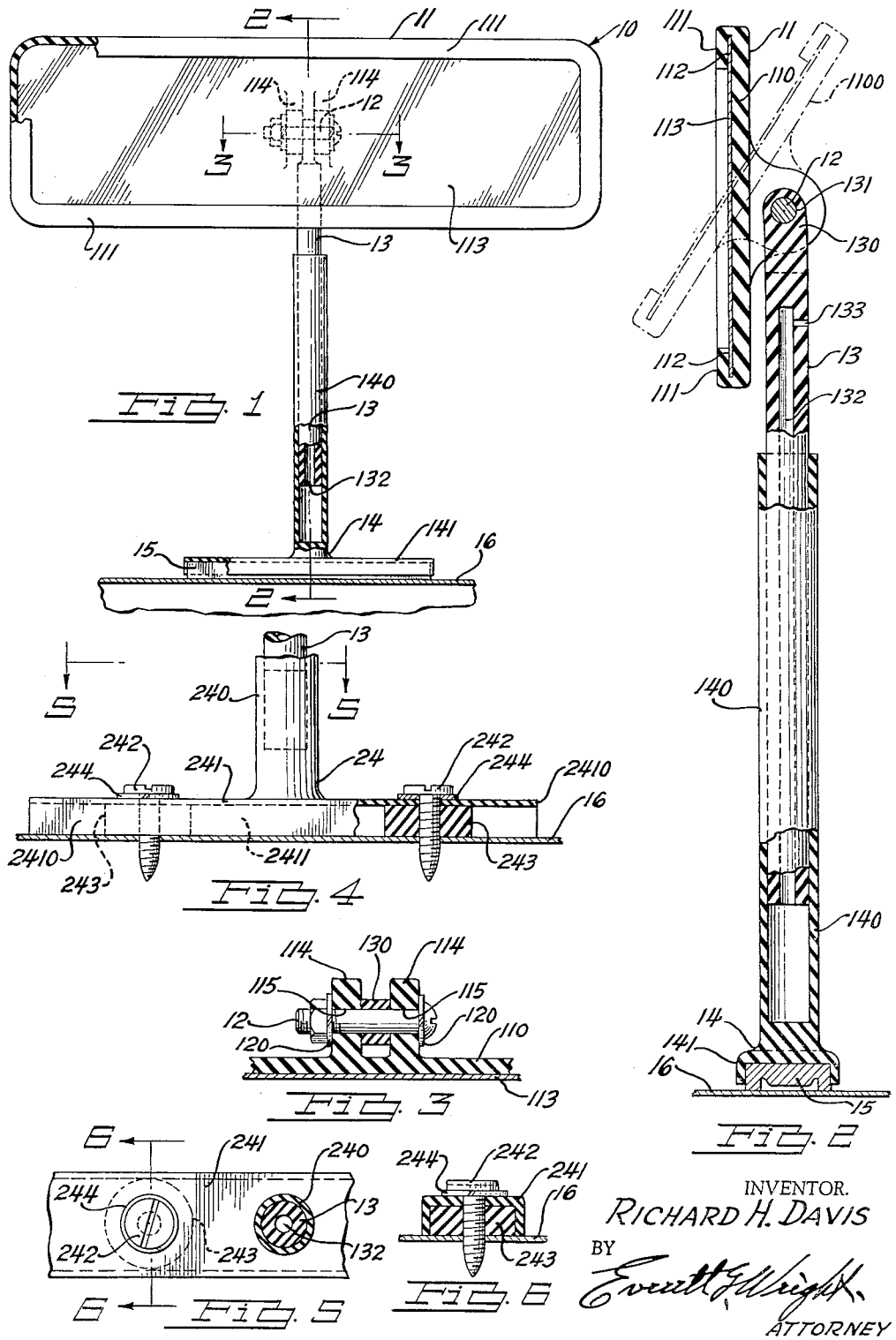

2,995,983
SAFETY REAR VIEW MIRRORS
Richard H. Davis, 280 Richton, Highland Park, Mich.
Filed July 2, 1958, Ser. No. 746,291
1 Claim. (Cl. 88—98)

This invention relates to safety rear view mirrors for motor vehicles which are mountable on or about the windshield frame or dash of an automobile within the passenger compartment thereof.

In the prior art, many attempts have been made to make motor vehicles more safe and to safeguard passengers from skull and facial injury resulting from automobile accidents, particularly head-on collisions and the like. These efforts have brought into general use crash pads to absorb a portion of the blow when a passenger's head or face strikes a dash panel of an automotive vehicle during an accident or extremely quick stops. In addition, safety belts are ofttimes employed in attempts to avoid serious injury in automobile accidents. However, safety belts have not been generally accepted because of their nuisance and because of the adverse psychological reaction to their use.

In many severe yet non-fatal automobile accidents, major skull and facial injuries ofttimes occur as the result of the head or face of the driver or front seat passenger striking the rear view mirror which is secured either to the windshield frame above the windshield or on the dash below the windshield.

The primary object of the instant invention is to provide a safety rear view mirror adapted to be mounted within the passenger compartment of an automotive vehicle on the windshield frame or dash thereof, which rear view mirror is not only substantially harmless if struck by a person's face or head in an automobile accident but which serves as a blow absorbing medium if and when a person's face or head is thrown thereagainst.

Another object of the invention is to provide a safety rear view mirror that may be easily and readily mounted in the passenger compartment of an automotive vehicle either on the windshield frame or on the dash of said vehicle.

Other objects of the invention will become obvious by reference to the following detailed description taken in connection with the accompanying drawing, in which:

FIG. 1 is an elevational view of a rear view mirror embodying the invention with certain parts being broken away to better illustrate the construction, the base including magnetic securing means.

FIG. 2 is an enlarged vertical sectional view taken on the line 2—2 of FIG. 1.

FIG. 3 is an enlarged fragmentary horizontal sectional view taken on the line 3—3 of FIG. 1.

FIG. 4 is a detailed view part in section and part in elevation of alternate base construction employing alternate securing means.

FIG. 5 is a fragmentary horizontal sectional view taken on the line 5—5 of FIG. 4.

FIG. 6 is a cross sectional view taken on the line 6—6 of FIG. 5.

Referring now to the drawings wherein like numerals refer to like and corresponding parts throughout the several views, the particular embodiment of a safety view mirror 10 embodying the invention disclosed for illustrative purposes consists of a safety head element 11 pivotally connected by a clamp type pivot means 12 to a supporting post 13 telescoped into a base element 14 which may include magnetic means 15 for securing said base element 14 to a selected metallic portion of a motor vehicle such as a windshield frame member or the dash ledge over the instrument panel thereof generally designated by the numeral 16.

The safety head element 11 of the rear view mirror 10 consists of a flexible resilient rubber panel 110 including integral molding 111 therearound suitably grooved at 112 adjacent said flexible panel 110 to receive the periphery of a thin flexible resilient metallic mirror element 113, which is positioned against the face of the rubber panel 110. The rear of the rubber panel 110 of the safety head element 11 is preferably provided with a pair of centrally located rearwardly extending laterally spaced tabs 114 suitably apertured at 115 to accommodate the clamp type pivot means or stud 12 and washers 120 as best shown in FIG. 3.

The supporting post 13 is also formed on flexible resilient rubber and is preferably round except at its upper end which is flattened into an ear 130 of a width substantially equal to the space between the said laterally spaced tabs 114 of the panel 110 of the safety head element 11. The said ear 130 is apertured at 131 to accommodate the clamping pivot stud 12 so that the safety head element 11 may be pivotally connected and clamped by the said pivot stud 12 to the supporting post 113 at any desired angle with respect thereto as indicated by the dot and dash lines 1100 in FIG. 2. The said supporting post 13 is preferably formed hollow as indicated by the numeral 132 from its lower end to a point adjacent but somewhat below the ear 130 thereof. The said supporting post 13 has an air bleed aperture therethrough at 133 communicating between the hollow portion 132 thereof and ambient air.

The hollow supporting post 13 is telescoped into the flexible tubular base post 140 of the base element 14 of flexible resilient rubber which extends upwardly from a horizontal channel type base member 141 into whic' a permanent magnet securing means 15 may be cemented as best shown in FIGS. 1 and 2. When telescoping the hollow supporting post 13 into the tubular base post 140 of the base element 14, entrapped air is expelled through the bleed aperture 133 in the said hollow supporting post 13 at the upper end of the hollow portion 132 thereof.

With the foregoing construction, the height of the safety mirror head element 11 from the base member 141 of the base element 14 may be varied by the extent to which the hollow supporting post 13 is telescoped into the tubular base post 140 of the said base element 14. The bottom of the hollow supporting post 13 and the top of the tubular base post 140 of the base element 14 may be snipped off with ordinary shears to provide an extremely short spacing of the safety head element 11 above the base member 141 of the base element 11. Also, the supporting post 13 may be telescoped into the hollow base post 140 of the base element 14 so as to position the safety mirror head element 11 at any desired angular relationship with respect to the base member 141 of the base element 14. This, together with the pivoting of the mirror head element 11 in any desired angular relationship about the clamping pivot stud 12, provides a substantially universal adjustment of the attitude of the mirror element 113.

When in use, if the head or face of the driver or a passenger of an automobile should strike the safety rear view mirror 10 during an accident or quick stop of the vehicle, the several parts of the safety rear view mirror 10 would yield to the blow, and no material injury would be suffered by the person thrown thereagainst. If the magnetic securing means 15 were employed to mount the safety rear view mirror 10 on the windshield frame or dash 16 of a vehicle, striking the safety rear view mirror 10 would also free it from its mounted position to which it may be readily replaced.

Referring now particularly to FIGS. 4, 5 and 6, an alternate base element 24 is disclosed, which also is preferably molded of flexible resilient rubber. The said base element 24 is like and similar to the base element 14 and consists of a flexible tubular base post 240 which extends upwardly from a horizontal channel type base member 241. The magnetic securing means 15 is omitted, and in substitution therefor are a pair of sheet metal screws 242 and a pair of preferably resilient rubber filler washers 243 and a pair of screw head washers 244. The top of the channel base member 241 may be suitably punctured each side of the tubular base post 240 wherever desired to accommodate the sheet metal screws 242. The said sheet metal screws 242, head washers 244 and filler washers 243 are then assembled to the channel base member 241, and the channel base member 241 is secured by the said sheet metal screws 242 to a windshield frame or dash 16 as illustrated in the drawings. The surplus portions 2410 of the base member 241 disposed outwardly from the filler washers 243 may be snipped off, if desired.

With the said alternate base element 24, the hollow portion 2411 of the channel base member 241 between the filler washers 243 provides extra flexibility at the base post 240 to assure deflection of the said base post 240 even though the base element 24 is permanently fixed to the windshield frame or dash 16.

Although but a single embodiment of the invention and a single alternate base securing means has been disclosed and described in detail, it is obvious that many changes may be made in the size, shape, arrangement and detail of the various elements of the invention all without departing from the spirit and scope of the invention as defined by the appended claim.

I claim:

A safety rear view mirror comprising a head element consisting of a flexible resilient rubber backing panel including an inwardly grooved integral molding therearound, a thin flexible metallic resilient mirror element positioned against said backing panel and engaged at its periphery in the said grooved molding thereof, a flexible resilient tubular rubber supporting post for said head element, means adjustably securing said head element to said supporting means, a flexible resilient rubber base element including a channel shaped base member and a flexible resilient tubular base post extending upwardly therefrom telescopingly receiving said resilient tubular supporting post, and means securing said channel shaped base member to a portion of a vehicle within the passenger compartment thereof consisting of filler washers filling said channel shaped base member at selected distances each side of said tubular base post, and means disposed through the top of said channel extending through said filler washers securing said base member at said selected base distances to a portion of a motor vehicle within the passenger compartment thereof.

References Cited in the file of this patent

UNITED STATES PATENTS

| | | |
|---|---|---|
| 884,512 | May | Apr. 14, 1908 |
| 1,380,193 | Dinguid | May 31, 1921 |
| 1,599,066 | Rushmore | Sept. 7, 1926 |
| 1,828,804 | Horton | Oct. 27, 1931 |
| 1,962,597 | Hunter | June 12, 1934 |
| 2,097,419 | Schmidt | Oct. 26, 1937 |
| 2,112,316 | Turner | Mar. 29, 1938 |
| 2,261,301 | Smith | Nov. 4, 1941 |
| 2,573,443 | Holland | Oct. 30, 1951 |
| 2,880,651 | Fenyo | Apr. 7, 1959 |
| 2,915,944 | Butts | Dec. 8, 1959 |

FOREIGN PATENTS

| | | |
|---|---|---|
| 1,083,858 | France | June 30, 1954 |
| 1,157,934 | France | Jan. 6, 1958 |